(12) United States Patent
Lenart et al.

(10) Patent No.: US 9,357,498 B2
(45) Date of Patent: May 31, 2016

(54) METHOD AND DEVICE WITH DYNAMIC DORMANCY

(71) Applicant: GOOGLE TECHNOLOGY HOLDINGS LLC, Mountain View, CA (US)

(72) Inventors: Andrew W. Lenart, Lake Villa, IL (US); Gregory R. Black, Vernon Hills, IL (US); Oleg Y. Klementiev, Barrington, IL (US); Valeriy F. Marchevsky, Vernon Hills, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 94 days.

(21) Appl. No.: 13/921,239

(22) Filed: Jun. 19, 2013

(65) Prior Publication Data
US 2013/0301504 A1    Nov. 14, 2013

Related U.S. Application Data

(63) Continuation of application No. 12/821,164, filed on Jun. 23, 2010, now Pat. No. 8,504,002.

(51) Int. Cl.
*H04W 52/02* (2009.01)
(52) U.S. Cl.
CPC ........ *H04W 52/028* (2013.01); *H04W 52/0225* (2013.01); *Y02B 60/50* (2013.01)
(58) Field of Classification Search
None
See application file for complete search history.

(56) References Cited

U.S. PATENT DOCUMENTS

| 5,442,637 A | 8/1995 | Nguyen |
| 7,590,403 B1 | 9/2009 | House et al. |
| 2007/0135080 A1* | 6/2007 | Islam et al. ................ 455/343.1 |
| 2009/0124212 A1 | 5/2009 | Islam et al. |
| 2009/0129339 A1 | 5/2009 | Young et al. |
| 2009/0221277 A1* | 9/2009 | Fomin et al. .................. 455/418 |
| 2010/0153804 A1 | 6/2010 | Cai et al. |

FOREIGN PATENT DOCUMENTS

| EP | 2063571 A2 | 5/2009 |
| EP | 1956859 B1 | 6/2009 |

OTHER PUBLICATIONS

Notification of Second Office Action and Search Report, issued Jul. 3, 2015 in corresponding Chinese Application No. 201180030724.5.

* cited by examiner

*Primary Examiner* — Kwang B Yao
*Assistant Examiner* — Adam Duda
(74) *Attorney, Agent, or Firm* — Morris & Kamlay LLP

(57) ABSTRACT

A method (200) and device (300) for saving energy in a wireless communication device configured to maintain a persistent communication session over a wireless network with an application server are disclosed. The method (200) can include: opening (210) a persistent communication session with an application server via a cellular network; measuring (220) a round trip time from sending a message to the application server to receiving an acknowledgement message from the application server; and automatically transitioning (230) the device from a first operating state to a second operating state after an amount of time in the absence of subsequent data traffic exceeding a predetermined threshold, wherein power consumption associated with the second operating state is less than power consumption associated with the first operating state, and the predetermined threshold is a function of the measured round trip time.

8 Claims, 9 Drawing Sheets

METHOD AND DEVICE WITH DYNAMIC DORMANCY

FIELD OF THE INVENTION

The field of the invention relates to a method and device with a dynamic dormancy feature that can help to reduce energy drain.

BACKGROUND OF THE INVENTION

Mobile computing devices, such as mobile or wireless stations, cell phones, radios, laptops, wireless communication devices and the like, operate with a power storage device with a limited energy supply, such as a battery, fuel cell or the like. A mobile computing device needs a power source and, in many cases, this power source is a battery. For instance, cellular phones use various types of batteries to operate. The amount of time a mobile station can typically operate before the energy of the battery is consumed (which is often referred to as "battery life"), is often an important criteria that consumers use in choosing one brand or type of mobile computing device over another brand. The terms battery, energy storage device and power storage device are used interchangeably herein.

While the power storage device is generally rechargeable, it may not be convenient or even possible for a user to recharge. Accordingly, there is a need to maximize the useful operational time of a wireless computing device. Additionally, different operating environments can cause the user to be surprised and/or frustrated when the battery runs out much more quickly than would typically be expected by the user. Thus, a variation from the norm or unexpected short battery life is very undesirable from a user perspective.

This is a particularly relevant problem for mobile computing devices running applications supported by an applications server because of the power drain due to the wireless data exchange between the mobile device and the server, since each upload or download causes the consumption of energy in the mobile device and server. The problem is especially acute in the mobile device, which is typically battery powered and has finite energy available. Accordingly, it is desirable to improve battery life of mobile devices operating on any network. For example, in connection with the operation of a 3G network, a mobile device is typically in a persistent internet communication with an application server. It is also desirable to reduce the inefficiencies on the 3G network.

In devices running applications in communication with an application server, a persistent internet protocol (IP) session is typically used, in accordance with HTTP1.1, such that the IP session remains open for a predefined period, such as 30 minutes. The use of persistent IP sessions is helpful in that each opening and closing of an IP session requires the transmission of overhead data. Thus it is beneficial to maintain a persistent IP session, from the standpoint of minimizing the amount of data traffic and consequently minimizing the energy consumption in the mobile device.

Operation over a wireless network involves operating according to a wireless protocol, such as the Universal Mobile Telecommunications Standard (UMTS) or another protocol. Wireless protocols such as UMTS provide different transceiver operating states, according to needs to transfer different amounts of data. Transceiver operating states with faster data transfer capabilities for transferring higher amounts of data typically require higher power from the device energy source of the device. Accordingly, if the amount of data to be transmitted is large, the wireless transceiver operates in an active, or high data rate and high power state, and conversely if the amount of data to transmit is small the transceiver operates in an idle, or low data rate and low power, state.

During persistent IP sessions there may be periods when there is no data traffic. During these periods of no data traffic it is often beneficial from the standpoint of energy consumption for the wireless transceiver in the mobile device to transition to an idle state. In a UMTS network, during periods of no data transfer, the amount of time that the transceiver stays in an active state prior to transitioning to idle depends on a network determined inactivity timer. Network inactivity timers vary greatly from network to network. In some networks the inactivity timer approximates the maximum round trip time (RTT), which is the maximum amount of time for a mobile device to send a message to a recipient, such as an application server, and for the recipient to receive the message and send an acknowledgement message, and for the mobile device to receive the acknowledgement message. The network inactivity time is typically set to a worst case RTT value. A worst case RTT value may occur under adverse signaling conditions such as low signal power, low receiver level, high interference or poor received data quality. Under normal signaling conditions the worst case RTT value results in the mobile transceiver staying in the active state for longer than is necessary.

Thus it would be beneficial and there is a need for a mobile device to measure the actual RTT, and to request the transition to idle based on the measured RTT, before the expiration of the network defined inactivity timer.

In other networks, the network inactivity timer is often set to a longer value, which may include an amount of time for a subsequent message to be sent by the mobile device to the recipient, or by the recipient to the mobile device. For example in web-browsing applications there is a high probability of a subsequent message occurring within a time, T, which is typically longer than RTT. Thus there is a wide range of network inactivity periods, depending on network settings.

In more detail, a mobile device operating on a first network may transition to idle after a short period determined primarily by the network configuration, such as 3 seconds, and the mobile operating on a second network may transition to idle after a much longer period determined by the expected time of a subsequent message, such as 90 seconds. The value of T may be determined by a worst case application running on the mobile device, such as a browser application, where there is a high probability of a subsequent message. For example, for a web-browsing application it may be determined that there is a high probability of a delayed mobile device user response. Conversely many applications have virtually immediate subsequent responses.

Thus it would be beneficial for a mobile device to request a transition to idle before the expiration of the network defined inactivity timer, such that the request occurs after a predefined period which depends on the running applications. For example, if the running application only includes applications with a low probability of subsequent data transfer, such as a data pushing service from an application server, then transition to idle may occur after a period depending on the RTT. If the running application includes an application with a high probability of subsequent data transfer, such as a web browser, then the transition to idle may occur after a period depending on T, which is typically much longer. Alternatively if the running application includes an application with a high probability of subsequent data transfer, such as a web browser, then the transition to idle may occur based on the expiration of the default network defined inactivity timer.

It would be considered an improvement in the art, if the energy drain in a wireless communication device could be minimized thereby extending battery life, and network efficiencies could be enhanced.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve the understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

Figure 1:
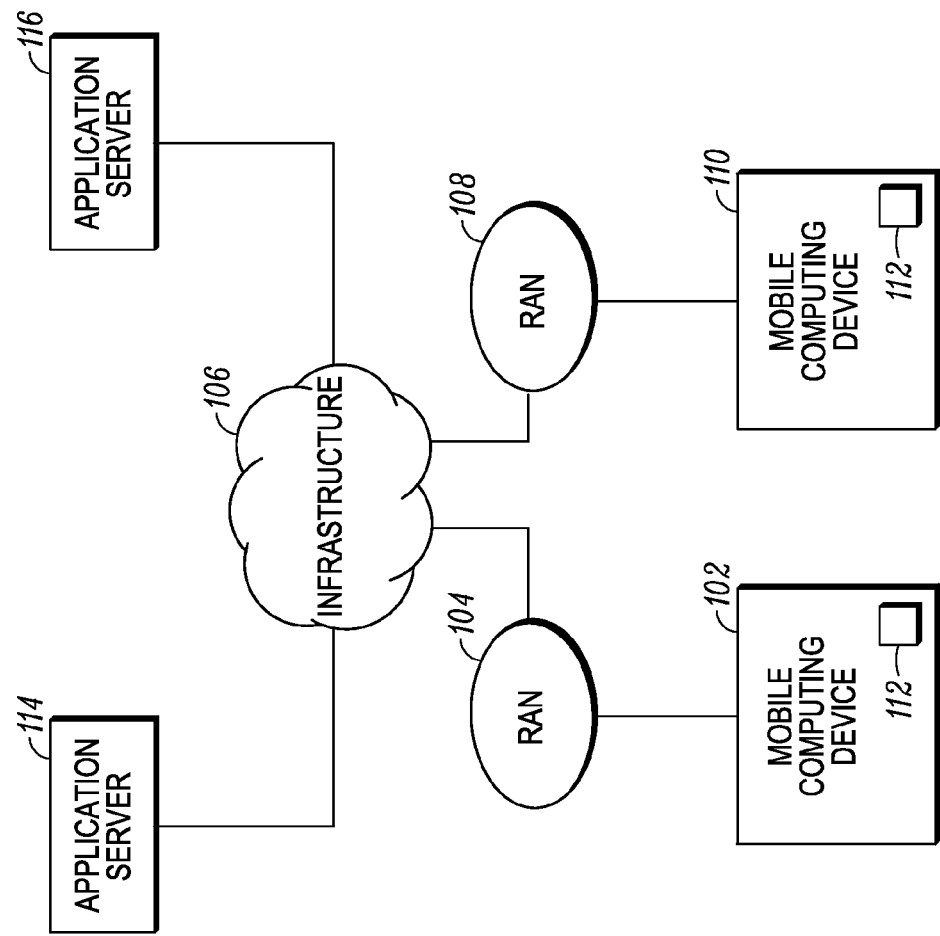
FIG. 1 is a block diagram of a system showing wireless communication devices with dynamic dormancy modules, to reduce energy drain, according to the present invention.

Referring to FIG. 1, one example of a system with efficient server communication for increasing the battery life of a mobile computing device, is described. The system includes a first mobile computing device 102 that is coupled to a first Radio Access Network (RAN) 104. The first RAN 104 is coupled to a communication infrastructure 106. The infrastructure can include a plurality of application servers, for running various applications, as detailed below. A second mobile computing device 110 is coupled to a second RAN 108. The second RAN 108 is also coupled to the infrastructure 106. The system includes application servers 114 and 116 for running applications in synchronous communications with mobile devices 102, 110. The principles described herein may be applied to a variety of wide area network systems, such as 2G and 3G networks, long-term evolution (LTE), ultra mobile wideband (UMB), 802.16e & m, High Rate Packet Data (HRPD) systems, or systems such as the Universal Mobile Telecommunication System (UMTS), as well as wireless local area networks, personal area networks, and wired networks.

The mobile computing devices 102 and 110 may be any type of mobile wireless device. As used herein, a mobile computing device also means a mobile station, mobile device, wireless communication device, wireless computing device, mobile device client, mobile or wireless station, cell phone, radio, laptop and the like, such terms may be used interchangeably herein.

The mobile computing devices 102 and 110 each include a dynamic dormancy module 112 for coordinating synchronous communications between application server poling applications, as detailed below. For example, the mobile computing devices 102 and 110 may be cellular telephones, pagers, radios, mobile stations, personal computers, or personal digital assistants. As should be understood by those skilled in the art, other examples of mobile computing devices are possible.

The RAN's 104 and 108 may be any device or combination of devices that allow the mobile computing devices 102 and 110 to have access to the communication infrastructure 106. For example, the RANs 104 and 108 may include access points, base stations, base station controllers, antennas, and other types of devices that facilitate these communications.

The communication infrastructure 106 preferably includes devices and/or networks that allow communications to be made between mobile stations. For example, the infrastructure 106 may include switches, servers, storage devices, and networks (e.g., wireless networks, the Internet, landline telephone networks) that facilitate communications between the mobile computing devices 102 and 110.

Figure 2:
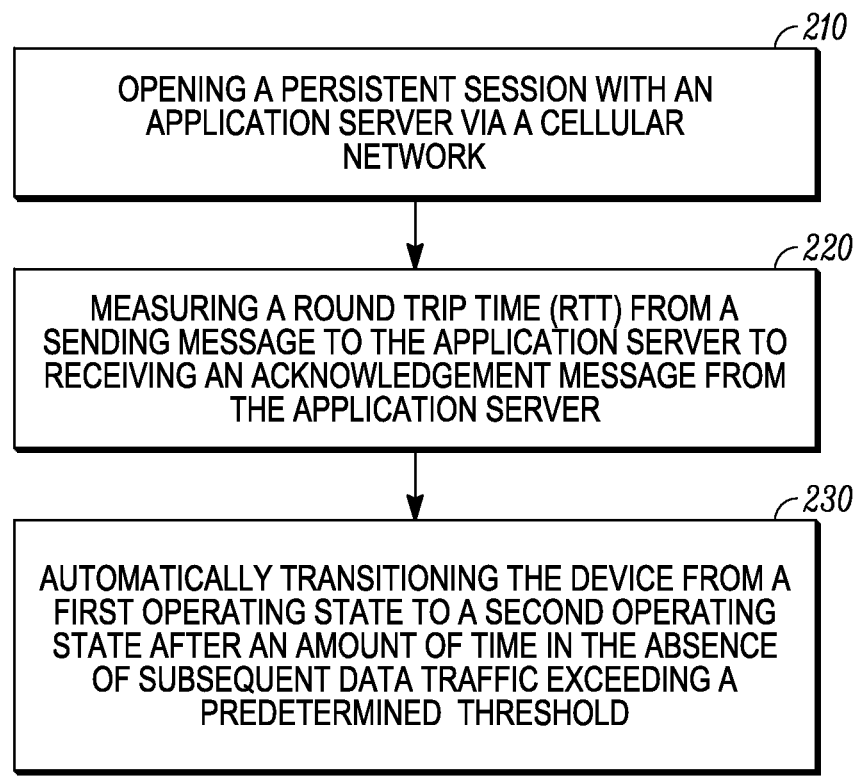
FIG. 2 is an exemplary block diagram of a method with dynamic data dormancy poll timing based on a round trip, in connection with a network and a wireless communication device, according to embodiments of the present invention.

FIG. 2 is an exemplary block diagram of a method 200 for saving energy in a wireless communication device configured to maintain a persistent communication session over a wireless network with an application server. The method 200 can include: opening 210 a persistent communication session with an application server via a cellular network; measuring 220 a round trip time (RTT) from sending a message to the application server to receiving an acknowledgement message from the application server; and automatically transitioning 230 the device from a first operating state to a second operating state after an amount of time in the absence of subsequent data traffic exceeding a predetermined threshold, wherein power consumption associated with the second operating state is less than power consumption associated with the first operating state, and the predetermined threshold is a function of the measured round trip time.

Advantageously, the method can measure the actual RTT and transition to a low power or idle state based on the measured RTT exceeding a predetermined threshold, before the expiration of a network configured inactivity timer (in the absence of subsequent data traffic), which helps to minimize unnecessary power drain in a wireless communication device and minimizes inefficiencies in connection with data exchanges between a network and a wireless communication device.

Stated differently, the automatically transitioning 230 can include transitioning the device from a first operating state to a second operating state, in response to a the measured round trip time exceeding a predetermined threshold in the absence of subsequent data traffic, wherein power consumption associated with the second operating state is less than power consumption associated with the first operating state.

In one embodiment, the network is a universal mobile telephone system (UMTS) network and the automatic transitioning step includes sending a signaling connection release indication (SCRI) to the network. Generally, in UMTS networks, the default method of transitioning from an active state to an idle state is to allow the network to control the transition based on network inactivity timers which are highly variable from network to network. Advantageously, the SCRI provides to the UMTS mobile device a simple and rapid method of transitioning from an active state to an idle state, with improved power savings, versus the default network controlled transition which is slower to transition to an idle state.

In a preferred embodiment, the predetermined threshold is greater than the measured round trip time by a predetermined offset or factor. In more detail, the predetermined threshold may be an amount equal to the RTT plus an offset amount of time X, for example Predetermined Threshold=RTT+X. The value of X may account for variation in the round trip time. Thus, for example the value of X may include a number of predetermined standard deviations of the RTT based on historical RTT measurements. The historical RTT measurement may be based on measurement from multiple networks or the one network that the device is presently operating on.

The predetermined threshold may also include an amount equal to the expected amount of time before a subsequent message, TS. For example, the Predetermined Threshold=RTT+X+TS. The value of TS may be dependant on the running applications. Thus if there is a running application in which the probability of a subsequent message is low then the value of TS could be relatively small or zero. For example, if the only running application is an aggregation service application, wherein data is aggregated from other servers such as a weather server, as social network server, and periodically pushed to the mobile device, then the probability of a subsequent message from the mobile device to the service is small, and TS may be set to zero. Conversely, if there is a running application in which the probability of a subsequent message is high, such as a web browser application, a relatively large value of TS could be employed in the calculation of a predetermined threshold. Alternatively, the case in which a web browser application is running, the transition to idle could be allowed to proceed without intervention by the mobile device according to the network determined inactivity timer.

In one embodiment, the first operating state includes at least one of a cell dedicated channel (CELL_DCH) state, a cell forward access channel (CELL_FACH), a cell paging channel (CELL_PCH) state, and a UTRAN registration area paging channel (URA_PCH) state and the second operating state includes an idle state. Alternatively the second operating state may be a lower power active state such as CELL_FACH. Advantageously, this embodiment has particular application to and can be compliant with the radio resource control specification 3GPP TS 25.331.

In a preferred embodiment, the step of automatically transitioning to the second operating state, comprises transmitting a signaling channel release indication (SCRI) to the network. Advantageously, the SCRI allows a wireless communication device to request the transition to idle to occur after a shorter period of data inactivity, versus the period determined by the default network inactivity transition timer, providing enhanced efficiency in a network and minimal power drain in a wireless communication device, in one use case.

In another embodiment, the method 200 can include the step of monitoring a traffic pattern, and the automatically transitioning step is disabled or delayed, if a predetermined traffic pattern is detected during the monitoring step. Automatically transitioning to idle after a shortened inactivity period is generally effective, but in certain circumstances it is advantageous to delay transition to idle.

In one example, if the traffic pattern includes a network employing a low power active state, such as the URA_PCH state, it may not be beneficial to expedite the transition to idle. The URA_PCH state is an active state used in some networks which has lower power then the more commonly used CELL_DCH active state. In cells employing the URA_PCH, a transition to idle may be ineffective for reducing power drain because of increased signaling associated with subsequent transition from idle back to URA_PCH. Advantageously, Applicant's method can provide for this case.

In more detail, in a preferred use case, the detected traffic pattern can include detecting at least one of a running application being a web browsing application, a display being enabled and motion in proximity to the mobile device, or other indications of user interaction. Applications requiring user interaction with a mobile device tend to have a high probability of subsequent data transfer. For example, web browsing applications have a traffic pattern in which there is a high probability of subsequent messaging. When a web page is downloaded from an application server there is a high probability that the user will interact with the page content causing a subsequent message from the mobile device back to the application server. When such traffic patterns occur, an expedited transition to idle may be ineffective for reducing power drain because of increased signaling associated with subsequent transitions back to the active state in order to send or receive the subsequent message. Alternatively, user interaction may be indicated by the display being active, and by motion being detected in proximity of the mobile device. Detected motion may include motion of the device itself, for example as measured by an accelerometer, or motion near the device as measured by changes in the position of objects in close proximity to the mobile device. Other indications of user interaction are possible, such as the time day, or day of the week, or the occurrence of scheduled as indicated by an alarm clock or a calendar. Advantageously, Applicant's method can provide for these cases by delaying transition to idle if the monitored traffic pattern is indicative of subsequent data transfer being likely.

In one embodiment, the network is configured to send an acknowledgment message in response to the signaling channel release indication, wherein automatically transitioning the device to the second operating state comprises configuring the device for the second operating state in response to receiving the acknowledgment message. In this way, the mobile device can effect an expedited transition to idle while maintaining uninterrupted network communication service.

In another embodiment, the mobile device includes a transmitter arrangement and a receiver arrangement, wherein automatically transitioning the device to the second operating state comprises disabling at least one of the transmitter arrangement and the receiver arrangement, for minimal power drain.

In another embodiment, the method 200 can include providing a settable threshold greater than the measured round trip time for automatically transitioning the device from a first operating state to a second operating state. Advantageously this feature can allow a user, through a user interface of the mobile device, to program or set the threshold time to automatically transition to idle, for example.

In another embodiment, the method 200 can include providing a rules table, based on for example, normal usage, carriers, etc. for adjusting and programming the threshold greater than the measured round trip time, for automatically transitioning the device from a first operating state to a second operating state. Advantageously, a user interface for selecting the traffic patterns, i.e. network and application conditions, in which to expedite or delay the transition from active to idle state can be provided. The conditions for determining whether to implement an expedited transition from active to idle may be the same conditions that the mobile device uses for implementing other power saving measures. For example, in a performance mode a user may want to delay before going to idle, whereas in a power saving mode a user may want a fast transition to idle, even if the response time for user interactions may possibly be adversely increased, due to the more frequent need to transition from idle back to active.

In another embodiment, the method 200 can include programming and adjusting the threshold greater than the measured round trip time based on at least one of signal strength, quality of service and receive level, for automatically transitioning the device from a first operating state to a second operating state. The measured RTT varies predictably with signal conditions. Thus the offset amount X of the predetermined threshold can be reduced under good channel conditions and increased under poor channel conditions. In this way the predetermined offset is minimized, thereby allowing a faster transition to the low power transceiver state when channel conditions are good.

In an extreme case, if operating channel conditions are good, and the measured RTT included measurements during poor channel conditions, then the offset X can be a negative offset.

Figure 3:
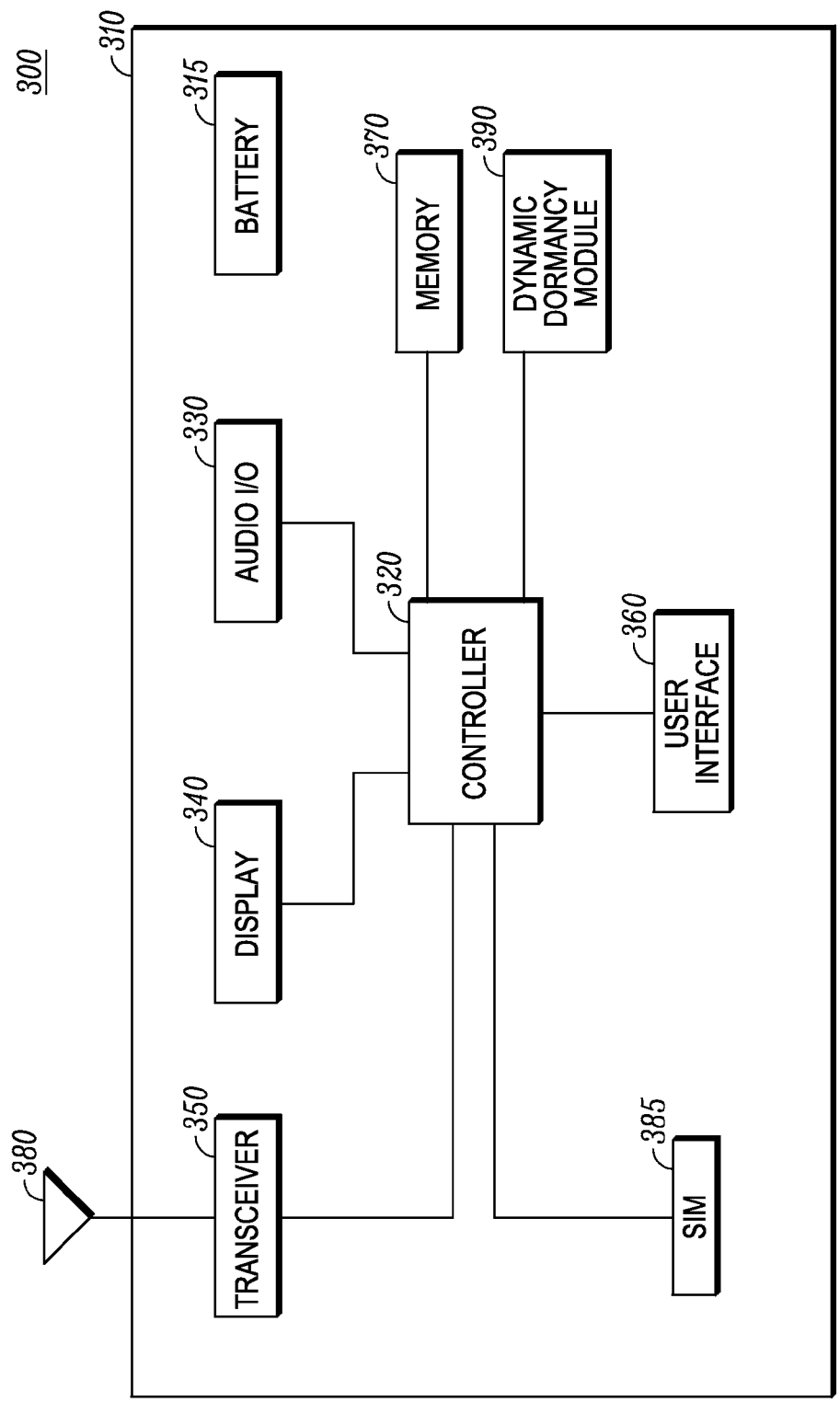
FIG. 3 is a block diagram of a mobile computing device with a dynamic dormancy module, according to an embodiment of the present invention.

Referring now to FIG. 3, there is shown an exemplary block diagram of a wireless communication device 300, such as the mobile devices 102 or 110. The wireless communication device 300 can include a housing 310, an energy storage device 315, a controller 320 coupled to the housing 310, audio input and output circuitry 330 coupled to the housing 310, a display 340 coupled to the housing 310, one or more transceivers 350 coupled to the housing 310, a user interface 360 coupled to the housing 310, a memory 370 coupled to the housing 310, an antenna 380 coupled to the housing 310, and a removable subscriber identity module (SIM) 385 coupled to the controller 320. The wireless communication device 300 can employ the controller 320 and memory 370 to run one or more applications in synchronous communication with an application server via transceiver 350. The wireless communication device 300 further includes a dynamic dormancy module 390, coupled to the controller 320. The dynamic dormancy module 390 can reside within the controller 320, can reside within the memory 370, can reside within the SIM 385, can be an autonomous module, can be an application, can be software, can be hardware, or can be in any other format useful for a module on a wireless communication device 300. In one embodiment, the dynamic dormancy module 390 can be defined as a controller for coordinating application server communication for each application.

The display 340 can be a liquid crystal display (LCD), a light emitting diode (LED) display, a plasma display, or any other means for displaying information. The transceiver 350 may include a transmitter and/or a receiver. The audio input and output circuitry 330 can include a microphone, a speaker, a transducer, or any other audio input and output circuitry. The user interface 360 can include a keypad, buttons, a touch pad, a joystick, an additional display, or any other device useful for providing an interface between a user and an electronic device. The memory 370 may include a random access memory, a read only memory, an optical memory or any other memory that can be coupled to a wireless communication device.

In more detail, in one embodiment, the wireless communication device 300, includes: a housing 310; a controller 320 coupled to the housing 310, the controller 320 configured to operate a wireless communication device; memory 370 coupled to the controller 320; a wireless transceiver 350 coupled to the controller 320, configured to maintain a persistent communication session over a wireless network with an application server; and a dynamic dormancy module 390 configured to: open a persistent communication session with an application server via a cellular network; measure a round trip time (RTT) from sending a message to the application server to receiving an acknowledgement message from the application server; and automatically transition the device from a first operating state to a second operating state, after an amount of time in the absence of subsequent data traffic exceeding a predetermined threshold, wherein power consumption associated with the second operating state is less than power consumption associated with the first operating state and the predetermined threshold is a function of the measured round trip time. The dynamic dormancy module 390 provides an expedited transition to a lower power consumption state, which can provide a longer useful life for a wireless communication device before having to recharge a user's power storage device 315.

In one preferred use case, the wireless communication device 300 is adapted for use in most networks, and is particularly adapted for use in a universal mobile telephone system (UMTS) network and the automatic transition includes sending a signaling connection release indication (SCRI) to the network, for enhancing network efficiency. It is also preferred if the network is configured to send an acknowledgment message in response to receipt of a signaling channel release indication from the wireless communication device, wherein the automatic transition to the second operating state is in response to receiving the acknowledgment message.

In a preferred embodiment, the dynamic dormancy module 390 is configured to monitor a traffic pattern, and the automatic transition is disabled or delayed if a predetermined traffic pattern is detected during the monitoring of the traffic pattern, wherein the predetermined traffic pattern comprises at least one of: the network employing a low power drain active state such as URA_PCH, a running application being an application with high probability of subsequent messages such as a web browsing application, and detection of user activity such as a display being enabled and motion in proximity to the mobile device. In this way the dynamic dormancy module avoids expedited transition to idle when traffic conditions indicate that expedited transition to idle might be detrimental to the user experience.

In a preferred embodiment, the dynamic dormancy module 390 is configured: to provide a settable threshold greater than the measured round trip time for automatically transitioning the device from a first operating state to a second operating state, for improved flexibility; to provide a rules table for adjusting and programming the threshold greater than the measured round trip time, for automatically transitioning the device from a first operating state to a second operating state; and to provide programming and adjusting of the threshold greater than the measured round trip time based on at least one of signal strength, quality of service and receive level, for automatically transitioning the device from a first operating state to a second operating state. These features can provide, for example, a performance mode where a user may want to delay prompt transition to idle, a power saving mode wherein a user may want a fast transition to idle, even if the response time for user interactions may possibly be adversely increased, due to the more frequent need to transition from idle back to active, and a middle mode, based on user profile or history.

Figure 4:
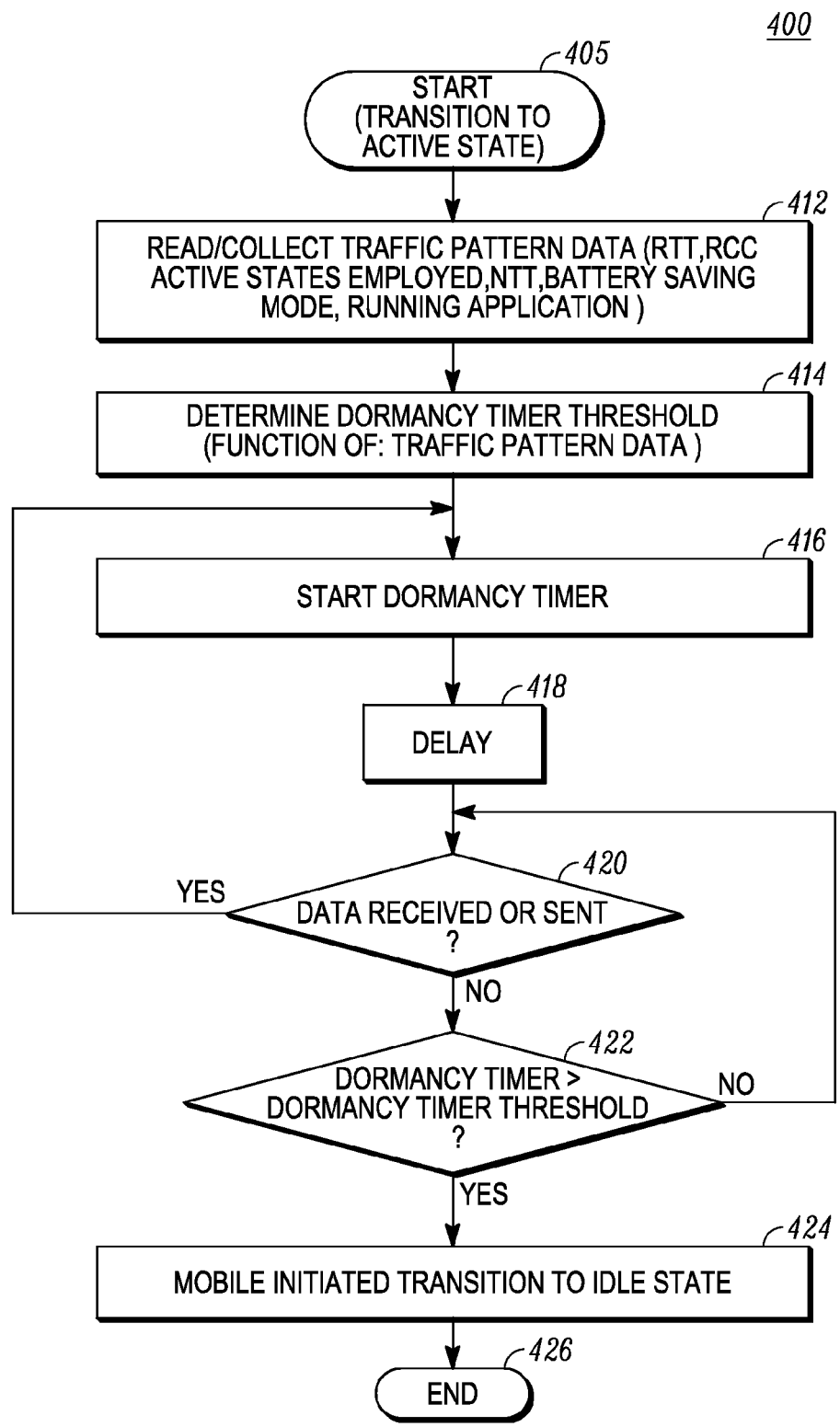
FIG. 4 is a block diagram of an exemplary method for dynamic data dormancy poll timing based on a round trip, in connection with a network and a wireless communication device, according to an embodiment of the present invention.

FIG. 4 is a block diagram 400 of an exemplary method for dynamic data dormancy timing in a wireless communication device 102, 110 based on a round trip time (RTT) of communication with an application server 114, 116 over a radio access network 104, 108 and infrastructure 106. A dynamic dormancy method starts at 405, when the mobile device transitions from idle to an active state. For example, in a mobile device operating in a UMTS system, the method begins when a radio resource controller in the UMTS network infrastructure controls the mobile device to enter an active state, such as a CELL_DCH state.

The first step in the dynamic dormancy method 400 is for the mobile device to collect traffic pattern data 412. Traffic pattern data includes the round trip time (RTT), which is the amount of network delay between sending a message to an application server and receiving an acknowledgement back from the application server. Traffic pattern data may also include the active states employed by the mobile device, as directed by the radio resource controller (RRC) in the network infrastructure, such as one or more of the CELL_DCH, CELL_FACH, CELL_PCH, and URA_PCH active states in a UMTS network. Optionally, the traffic pattern data may also include the network transition times (NTTs). A NTT is the network controlled time that the mobile device spends in an active state, in the absence of data traffic, if the dynamic dormancy method is disabled. The traffic pattern data may also include a battery saving mode which the device is presently operating in, such as a performance mode or a power saving mode. The traffic pattern data may also include the applications that are presently running on the device. In step 412 traffic pattern data may be read from memory, or collected in real-time. Traffic pattern data which tends to vary with network conditions, such as the network round trip time (RTT) may be collected, or monitored, during the dynamic dormancy process 400.

After collecting traffic pattern data 412 the method continues the step of determining a dormancy timer threshold 414. The dormancy timer threshold is the amount of time that the mobile device waits, in the absence of data traffic, before requesting to the network for a transition to idle mode. The dormancy time threshold may be a function of traffic pattern data. For example if the network round trip time (RTT) is approximately equal to (or greater than) the default network transition time (NTT) then the process 400 may be disabled, or a high dormancy timer threshold can be set, which effectively disables the process 400. Similarly, if a low power active state is employed, such as a URA_PCH state, then the process 400 may be disabled or delayed, or a high dormancy timer threshold can be set, which effectively disables the process 400. If a high performance battery saving mode is presently running then the dormancy timer threshold may be set to a higher value, and conversely, if a power saving battery saving mode is presently running then the dormancy timer threshold may be set to a lower value.

The process in 400 continues to the steps of starting the dormancy time 416, a delay step 418, and continues to decision box 420. If at decision box 420 it is determined that data has been sent or received, or "yes", then the process reverts to box 416 where the dormancy timer value is reset to zero. If at decision box 420 it is determined that data has not been sent or received, or "no", then the process continues to decision box 422. If at decision box 422 it is determined that the dormancy time value is not greater than the dormancy timer threshold, or "no", then the process reverts back to the delay step 418. If at decision box 422 it is determined that the dormancy time value is greater than the dormancy timer threshold, or "yes", then the process continues to step 424. At step 424 the mobile device initiates a transition to an idle state. In the case of a mobile device operating on a UMTS network the state transitions are under the control of the network infrastructure, thus the transition is made indirectly, by sending a signaling connection release indicator (SCRI) to the network. The SCRI is a request to the radio resource controller (RRC) in the network infrastructure to transition to an idle state, and the RRC responds by transitioning to idle, and the process ends 426. If at any time during the dynamic dormancy process 400 the RRC initiates a transition to idle then the process ends (not shown).

Figure 5:
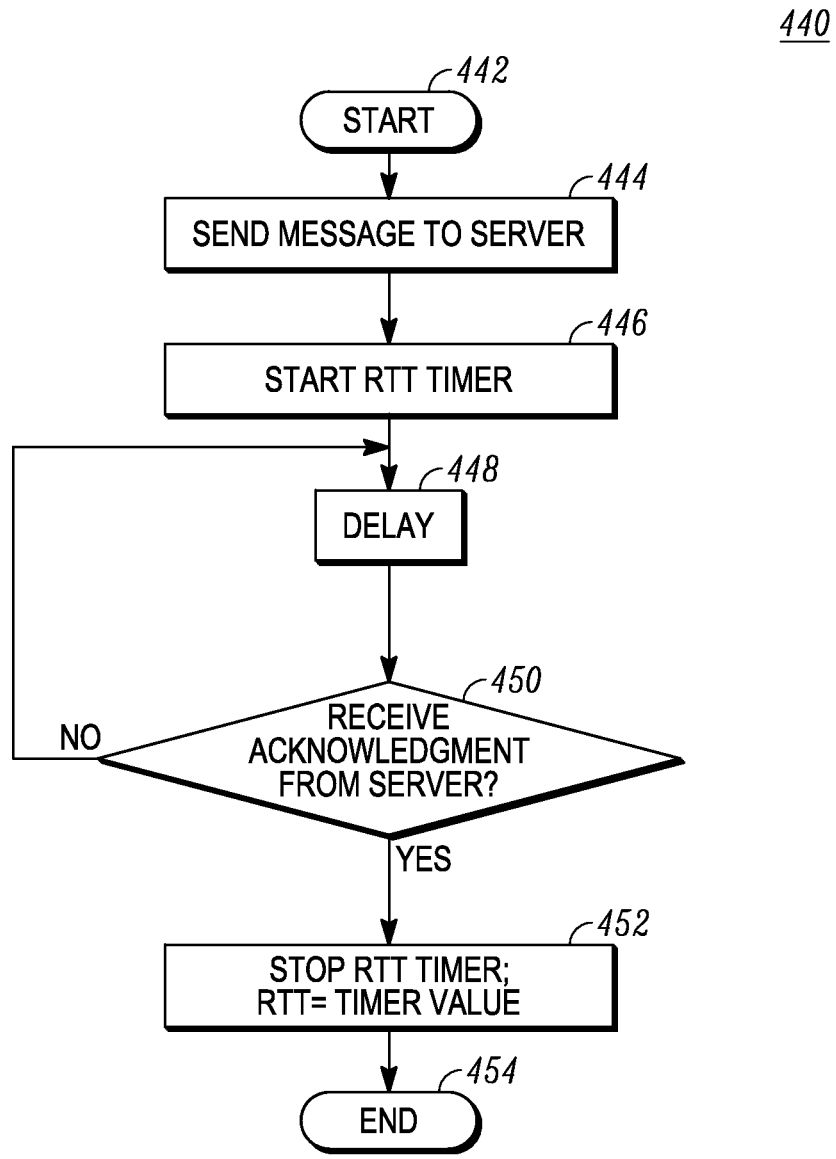
FIG. 5 is a block diagram of an exemplary method for measuring a round trip time, RTT, of a data connection between a wireless communication device and a data server, according to an embodiment of the present invention.

FIG. 5 is a block diagram 440 of an exemplary method for determining the round trip time (RTT) in a mobile device 102, 110 in communicate with an application server 114, 116, over a radio access network 104, 108 and infrastructure 106, as may be required in step 412 of process 400. The process starts at step 442 and proceeds to the step of sending a message to a server 444, using radio access network 104, 108 and infrastructure 106. The message may be a simple 'ping' message, requiring only an acknowledgement that the message was received, or it may be any data message requiring an acknowledgement back from the server. Such data messages may occur during normal operations, including synchronous communications between the mobile device and the server. The process proceeds to step 446 in which a round trip time (RTT) timer is started, followed by delay step 448. The process then continues to decision box 450. If at decision box 450 it is determined that an acknowledgement message has not been received from the server, or "no", then the process reverts back to delay step 448. If at decision box 450 it is determined that an acknowledgement message has been received from the server, or "yes", then the process continues to step 452, where the RTT timer is stopped and the RTT value is read from the RTT timer. The process then ends at step 454. The RTT value may vary with operating conditions, thus it may be optimal to determine the RTT in real-time, i.e. during operation of the dynamic dormancy process 400. Alternatively the RTT determination method 440 can be employed less often, with the RTT value stored in memory for later use in the traffic pattern collecting step 412 of the dynamic dormancy method 400.

Figure 6:
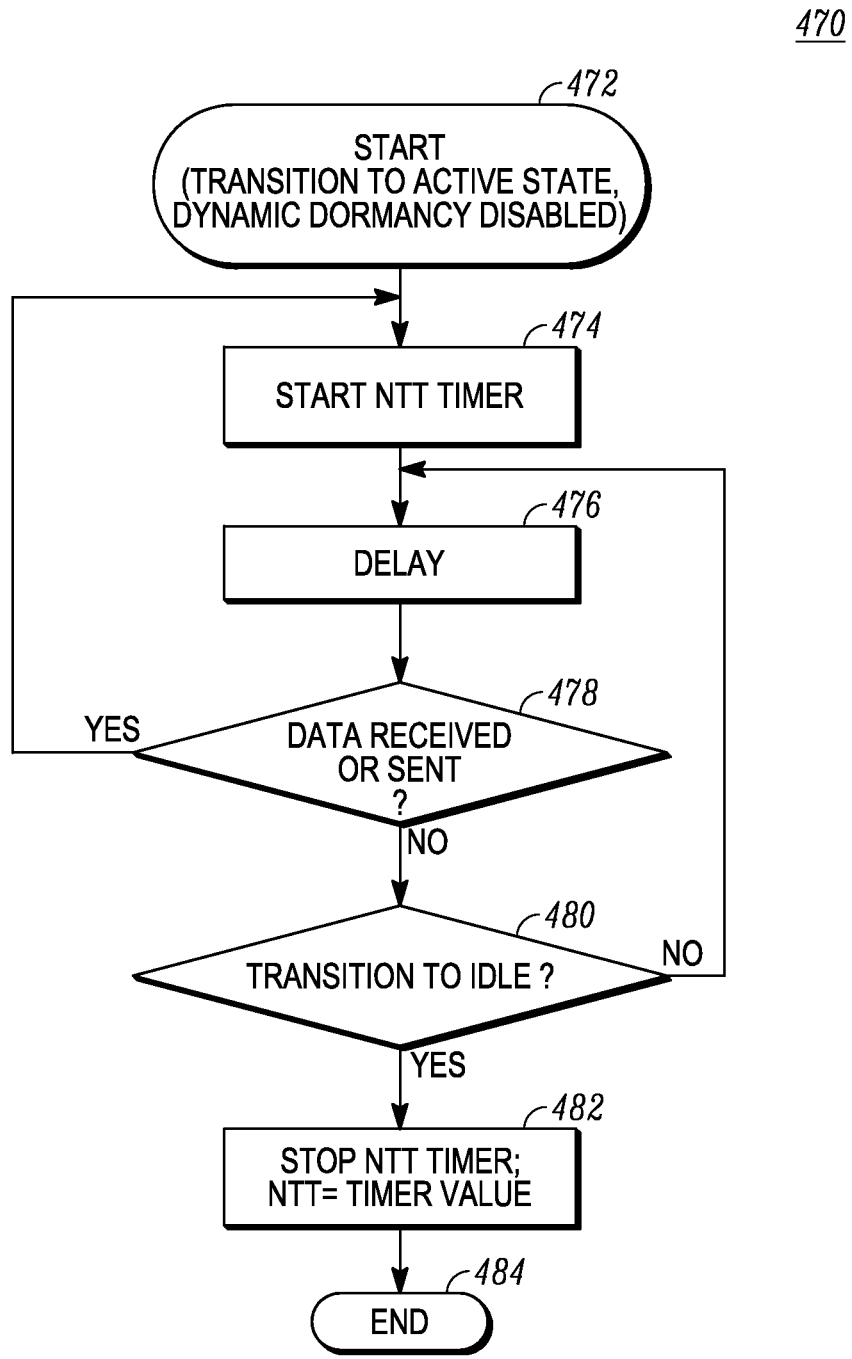
FIG. 6 is a block diagram of an exemplary method for measuring a network transition time, NTT, in a wireless communication device operating in a wireless network, according to an embodiment of the present invention.

FIG. 6 is a block diagram 470 of an exemplary method for determining the default network transition time (NTT) in a mobile device 102, 110 and a radio access network 104, 108 as may be required in step 412 of process 400. The NTT is the amount of time to transition from active to idle in the absence of data traffic, assuming no intervention by the mobile device running a dynamic dormancy method, which is typically controlled by a radio resource controller (RRC) in the radio access network 104, 108. The process starts at step 472, and proceeds to the step of starting an NTT timer at step 474, followed by a delay at step 476. The process then continues to decision box 478. If at decision box 478 it is determined that data has been received or sent, or "yes", then the process reverts back to restarting the NTT timer, 474. If at decision box 478 it is determined that data has not been received or sent, or "no", then the process continues to decision box 480. If at decision box 480 it is determined that the mobile device has not transitioned to idle, or "no", then the process reverts to the delay step 476. If at decision box 480 it is determined that the mobile has transitioned to idle then the process continues to step 482 where the NTT timer is stopped and the NTT value is read from the NTT timer. The process then ends at step 484. The NTT timer is typically a stable value determined by a timer value in the radio resource controller (RRC) of the radio access network (RAN) 104, 108. As such, the process 470 may be run infrequently, NTT values stored for later use in the traffic pattern collecting step 412 of the dynamic dormancy process 400. As each RAN provides different transition timer values, different values of NTT can be measured and stored in the mobile devices 102, 110 for different RANs. In this way the mobile device can determine 414 an appropriate dormancy timer threshold, depending on a stored NTT value for the present RAN. Alternatively the mobile device may determine whether to employ a dynamic dormancy method or to follow the default network control, depending on a stored NTT value for the present RAN.

Figure 7:
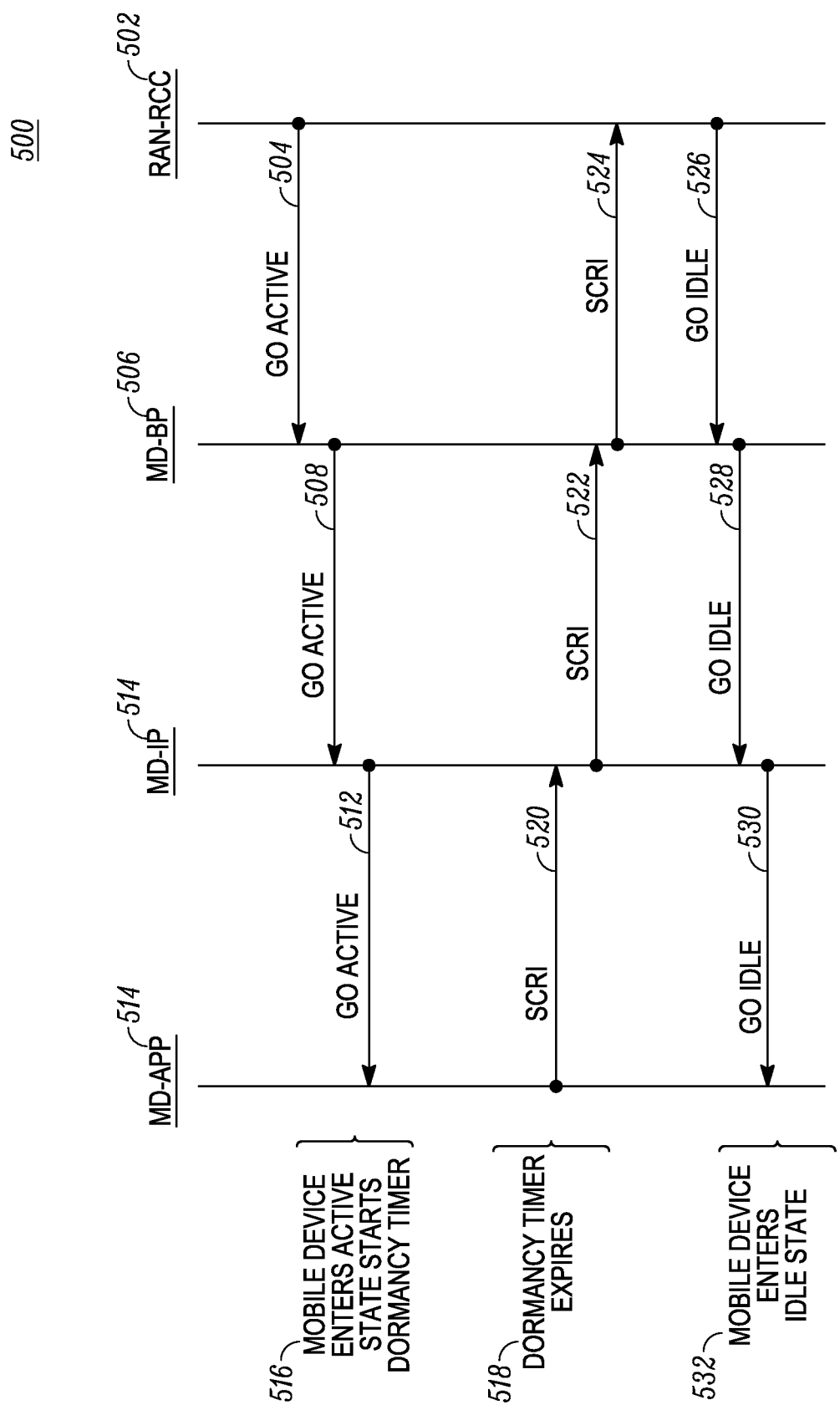
FIG. 7 is a ladder diagram of an exemplary method for dynamic data dormancy timing based on a round trip, in connection with a network and a wireless communication device, according to an embodiment of the present invention.

FIG. 7 is a simplified ladder diagram 500 of an exemplary method for dynamic data dormancy timing in a wireless communication device 102, 110 based on a round trip of communication with an application server 114, 116 over a radio access network 104, 108 and infrastructure 106. The method starts at the radio access network radio resource controller (RAN-RRC) 502. The RAN-RRC sends a 'go active' command over a wireless channel 504. The RAN-RRC command is received in the mobile device baseband processor (MD-BBP) 506, and forwarded to the mobile device internet processor (MD-IP) over internal data connection 510. The command is then forwarded to the mobile device applications processor (MD-APP) 514 over internal data connection 512. The MD-BP, MD-IP, and MD-APP are processes running on one or more of the mobile device transceiver 350, controller 320, and dynamic dormancy module 390 in FIG. 3. Upon receiving the go active command the mobile device enters an active state, as determined by specific the RAN-RRC command, and starts a dormancy timer 516. Upon expiration of the dynamic dormancy timer 518 the MD-APP 514 sends a signaling connection request indicator (SCRI) message over internal data connection 520 to the MD-IP. The MD-IP then sends the SCRI message over internal data connection 522 to the MD-BP 506 which sends the SCRI over wireless channel 524 to the RAN-RRC 502. Upon receiving the SCRI the RAN-RRC sends a 'go idle' command over the wireless channel 526 to the MD-BP 506. The MD-BP forwards the command over an internal data connection 528 to the MD-IP, which forwards the data command over an internal data connection 530 to the MD-App. At this point the mobile device enters the idle state 532.

Figure 8:
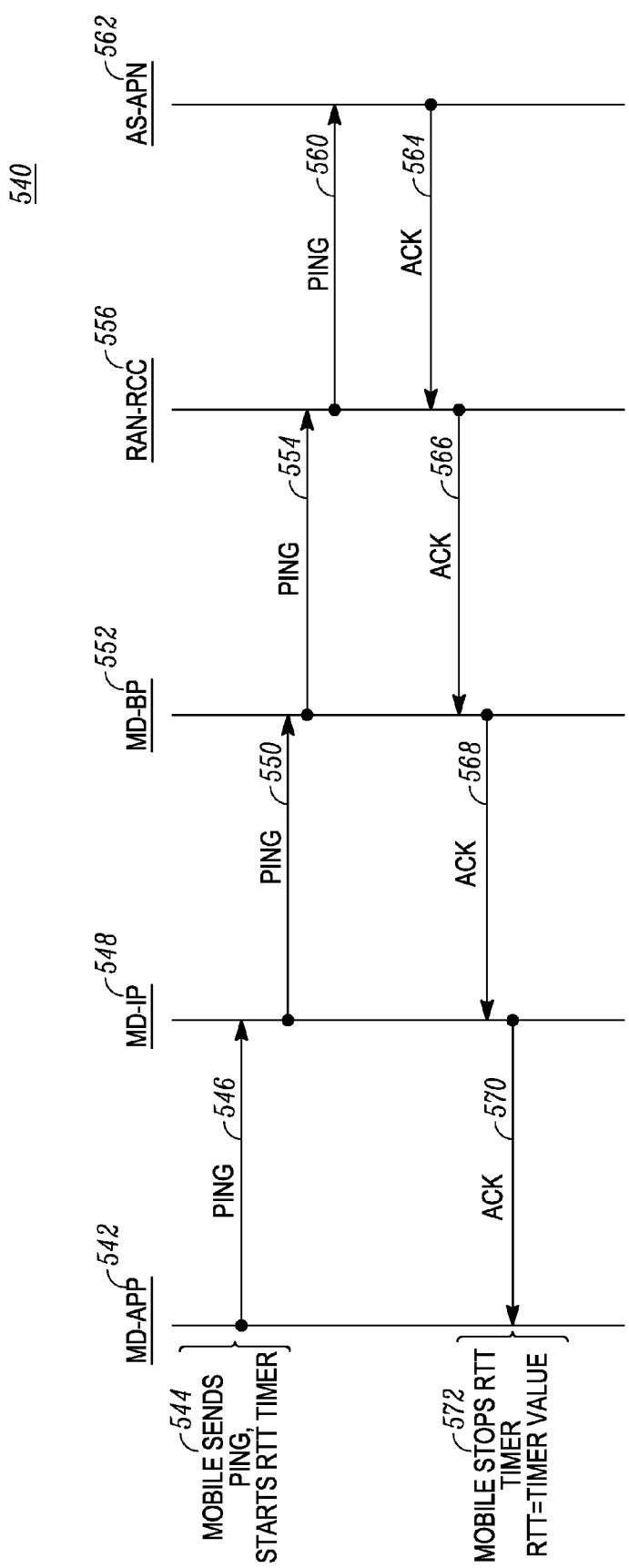
FIG. 8 is a ladder diagram of an exemplary method for measuring a round trip time, RTT, of a data connection between a wireless communication device and a data server, according to an embodiment of the present invention.

FIG. 8 is a ladder diagram 540 of an exemplary method for determining a round trip time (RTT) of a data connection between a mobile device 102, 110 and application server 114, 116 over a radio access network 104, 108 and infrastructure 106. The method starts at the mobile device applications process (MD-App) 542. The MD-App sends a data message, e.g. a 'Ping', over internal data connection 546 to the internet processor (MD-IP) 548, which sends the message over internal data connection 550 to the baseband processor (MD-BP) 552. The MD-BP, MD-IP, and MD-APP are processes running on one or more of the mobile device transceiver 350, controller 320, and dynamic dormancy module 390 as detailed in connection with FIG. 3. The MD-BP then sends the data message over a wireless channel 554 to the radio resource controller of the radio access network (RAN-RRC) 556. The RAN-RRC forwards the data message over an internet connection 560 to the application server application name (AS-APN) 562. Upon receiving the data message at the application server, the AS-APN sends an acknowledgement message, e.g. an 'Ack', over an internet connection 564 to the RAN-RRC-556. The RAN-RRC then sends the message over wireless channel 566 to the MD-BP, which sends the command over an internal data connection MD-IP, which sends the message over an internal data connection 570 to the MD-App. Upon receiving the acknowledgement message the mobile device stops the RTT timer, and makes the RTT timer value available to the dynamic dormancy module 390 at process step 412 of the dynamic dormancy process 400. In this way the mobile device provides an accurate RTT time for optimizing the dynamic dormancy timer threshold, enabling an optimum time for transitioning to idle based on the present traffic pattern and network conditions.

Figure 9:
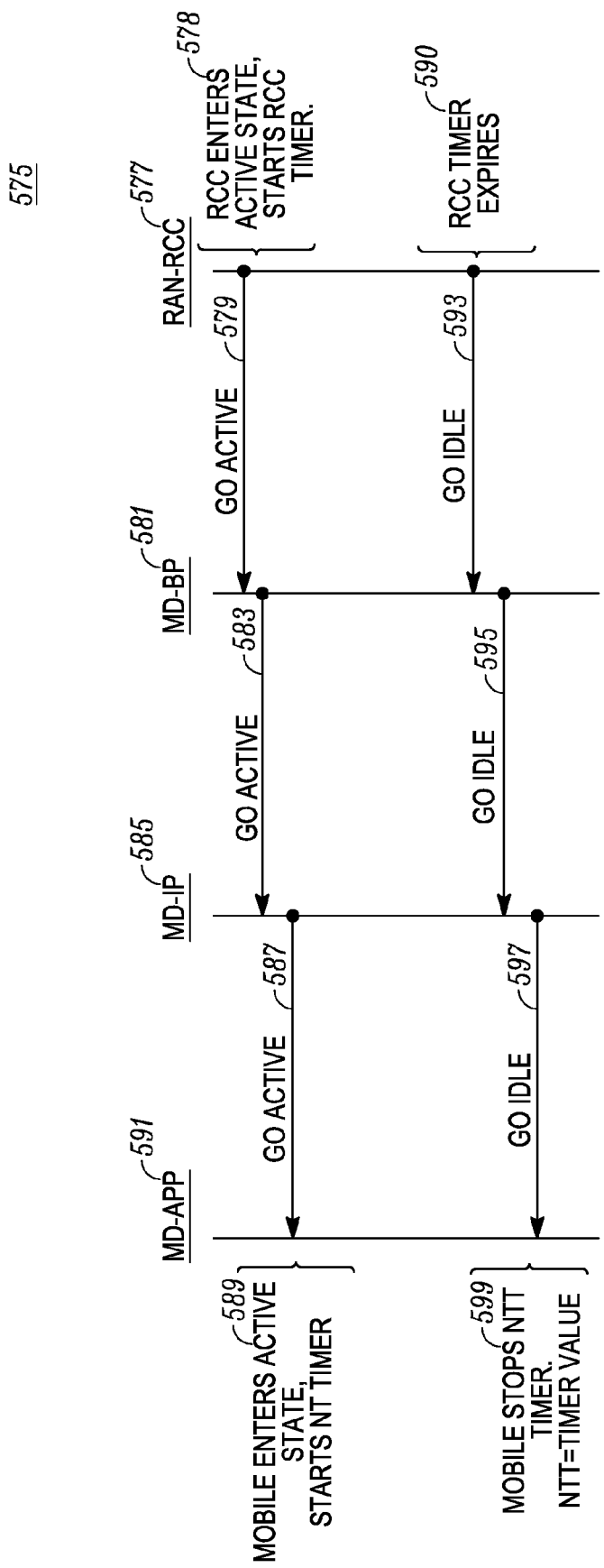
FIG. 9 is a ladder diagram of an exemplary method for measuring a network transition time, NTT, in a wireless communication device operating in a wireless network, according to an embodiment of the present invention.

FIG. 9 is a ladder diagram 575 of an exemplary method for determining the network dependant transition time (NTT) for a mobile device 102, 110 to transition from active to idle, in wireless communication with a radio access network 104, 108. The method starts at the radio access network radio resource controller (RAN-RRC) 577. The RAN-RRC enters an active state and starts an RRC timer 578. The RAN-RRC sends a 'go active' command over wireless channel 579 to the mobile device baseband processor (MD-BBP) 581. The MD-BBP forwards the command over an internal data channel 583 to the mobile device internet processor (MD-IP) 585 which forwards the command over an internal data channel 587 to the mobile device applications processor (MD-App) 591. Upon receiving the 'go active' command the mobile device enters an active state, as determined by the specific 'go active' command from the RRC, and starts a network transition (NT) timer 589. The process continues when the RRC timer expires 590 and the RAN-RRC 577 sends a go idle command over a wireless channel 593 to the MD-BP, which forward the command over an internal data connection 595 to the MD-IP, which forwards the command over an internal data connection 597 to the MD-App 591. Upon reception of the 'go idle' command the mobile device stops the NTT timer, and makes the RTT timer value available to the dynamic dormancy module 390 at process step 412 of the dynamic dormancy process 400. Thus the mobile device 102, 110 provides the NTT timer value, which an accurate measure RRC timer which the RAN 104, 108 uses for determining the amount of time that stays active before transitioning to idle. In this way the mobile device gets an accurate measure of the transition time from active to idle, for the RAN that it is presently operating with. Other measurements are possible, such as transition time from one active state to a lower power active state, such as from CELL_DCH to CELL_FACH.

The term application, as used herein, can include at least one of email, instant messaging, social networking, news feeding, gaming, media uploading (e.g. photo uploading), media downloading (e.g. music downloading), and data backup, or any other application requiring data synchronization or otherwise having regular communication with an application server.

Those skilled in the art will recognize that a wide variety of modifications, alterations, and combinations can be made with respect to the above described embodiments without departing from the broad scope of the invention, and that such modifications, alterations, and combinations are to be viewed as being within the scope of the invention.

The invention claimed is:

1. A method for saving energy in a device configured to maintain a persistent Internet Protocol (IP) communication session over a wireless network with an application server, the method comprising:

opening, at the device, the persistent IP communication session with the application server via the wireless network;

measuring, at the device, a round-trip time from sending a message to the application server to receiving an acknowledgement message from the application server; and transitioning, at the device, from a first operating state to a second operating state after an amount of time, exceeding a predetermined threshold, during which there is an absence of subsequent data traffic, wherein power consumption associated with the second operating state is less than power consumption associated with the first operating state, wherein the predetermined threshold is a function of the measured round-trip time, and wherein the predetermined threshold is a function of an expected amount of time before the device sends a subsequent message, the expected amount of time being based on a likelihood of a running application sending the subsequent message.

2. The method of claim 1 wherein the expected amount of time before the device sends a subsequent message is dependent upon a set of applications running on the device.

3. The method of claim 2 wherein if the set of applications running on the device includes a web browser, then the predetermined threshold is increased.

4. The method of claim 1 wherein the device comprises a transmitter arrangement and a receiver arrangement and wherein transitioning the device to the second operating state comprises disabling at least one of the transmitter arrangement and the receiver arrangement.

5. A wireless communication device comprising:
a housing;
a controller coupled to the housing, the controller configured to operate the wireless communication device;
memory coupled to the controller;
a wireless transceiver coupled to the controller, the wireless transceiver configured to maintain a persistent Internet Protocol (IP) communication session over a wireless network with an application server; and
a dynamic dormancy module configured to:
open the persistent IP communication session with the application server via the wireless network;
measure a round-trip time from sending a message to the application server to receiving an acknowledgement message from the application server; and
transition the device from a first operating state to a second operating state after an amount of time, exceeding a predetermined threshold, during which there is an absence of subsequent data traffic, wherein power consumption associated with the second operating state is less than power consumption associated with the first operating state, wherein the predetermined threshold is a function of the measured round-trip time, and wherein the predetermined threshold is a function of an expected amount of time before the device sends a subsequent message, the expected amount of time being based on a likelihood of a running application sending the subsequent message.

6. The wireless communication device of claim 5 wherein the expected amount of time before the device sends a subsequent message is dependent upon a set of applications running on the device.

7. The wireless communication device of claim 6 wherein if the set of applications running on the device includes a web browser, then the predetermined threshold is increased.

8. The wireless communication device of claim 5 wherein the device comprises a transmitter arrangement and a receiver arrangement and wherein transitioning the device to the second operating state comprises disabling at least one of the transmitter arrangement and the receiver arrangement.

* * * * *